March 13, 1962 KO MUROGA ET AL 3,025,356

AUTOMATIC TELEPHONE EXCHANGE SUBSCRIBER CIRCUIT

Filed Nov. 16, 1960 2 Sheets-Sheet 1

INVENTORS
KO MUROGA
JIRO OKUDA
BY Roy C. Hopgood
ATTORNEY

INVENTORS
KO MUROGA
JIRO OKUDA
BY Roy C. Hopgood
ATTORNEY.

United States Patent Office 3,025,356
Patented Mar. 13, 1962

3,025,356
AUTOMATIC TELEPHONE EXCHANGE SUBSCRIBER CIRCUIT

Ko Muroga and Jiro Okuda, Tokyo, Japan, assignors to Nippon Electric Company Limited, Tokyo, Japan, a corporation of Japan Filed Nov. 16, 1960, Ser. No. 69,736
3 Claims. (Cl. 179—18)

This invention relates to telecommunications systems and more particularly to automatic telephone systems either of the type using electromechanical switching means in the speech paths or of the all-electronic type using electronic switching means in the speech paths.

In an automatic telephone exchange, if a subscriber leaves the handset off the hook by mistake, or if the insulation of the subscriber line is damaged by a fault, the subscriber line assumes the same state as if the subscriber has requested connection to the exchange equipments, although he has no intention to do so. Since the equipments in the exchange, such as trunks, registers and links will be held vainly for a long time by such a faulty request, there will be a lowering of the exchange efficiency, a wasting of power, and repetition of meaningless operations. These, furthermore, are by no means desirable from the standpoint of maintenance.

The general object of the invention is to avoid difficulties such as above by providing novel means whereby the exchange will function to lock out subscribers in many cases such as above in order not to accept faulty connection requests from the subscribers, thereby releasing the exchange equipments to other calls.

The conventional electromechanical exchange system uses one relay per subscriber to block the subscriber and an electronic exchange uses one bit memory per subscriber, such as a delay element or a flip-flop memory element.

The present invention features an arrangement utilizing scanning pulses, which are supplied to the subscriber's circuit periodically to detect an originating call, to charge a capacitor through a diode in the scanning gate circuit with a certain time constant. If the capacitor is charged above a certain voltage level, the scanning pulse current through the capacitor is not large enough to start the call detection circuit, thus locking out the subscriber. The novel lockout circuit can be realized by addition of a small number of elements to the conventional subscriber circuit used in an electronic exchange employing scanning methods, and with no change whatever in the common control circuit. The invention provides alleviation of the limited scope of the subscriber line resistance and leakage resistance allowable for the conventional electromechanical exchange. The novel circuit utilizes a Zener diode which absorbs most of the induction noise voltage and impulse voltage disturbance always worrying highly sensitive equipments such as transistors in the electronic exchanges, and by such absorption provides an extremely stable and accurate circuit.

The invention provides an electronic exchange subscriber circuit characterized by a combination of a diode and a capacitor with different charging and discharging time constants, by utilization of subscriber scanning pulses in conjunction with the rectifying function of the diode-capacitor combination to produce a D.C. potential which appears across said capacitor in order to control the subscriber lockout function, by utilization of the forward characteristics of a Zener diode to maintain the lockout control potential at a certain definite positive voltage, by utilization of the cutoff region of the Zener diode during the lockout status of the subscriber to insure that the lockout control potential be determined solely by the rectification of the scanning pulses, and by utilization of the Zener region of the Zener diode to enable the lockout control potential to fall to base or ground potential with a certain definite time constant insuring the release from the lockout status within a suitable time when the locked out subscriber hangs up the handset.

The above mentioned and other features and objects of this invention and the manner of attaining them will become more apparent and the invention itself will be best understood by reference to the following description of an embodiment of the invention taken in conjunction with the accompanying drawings, wherein.

Figure 1:
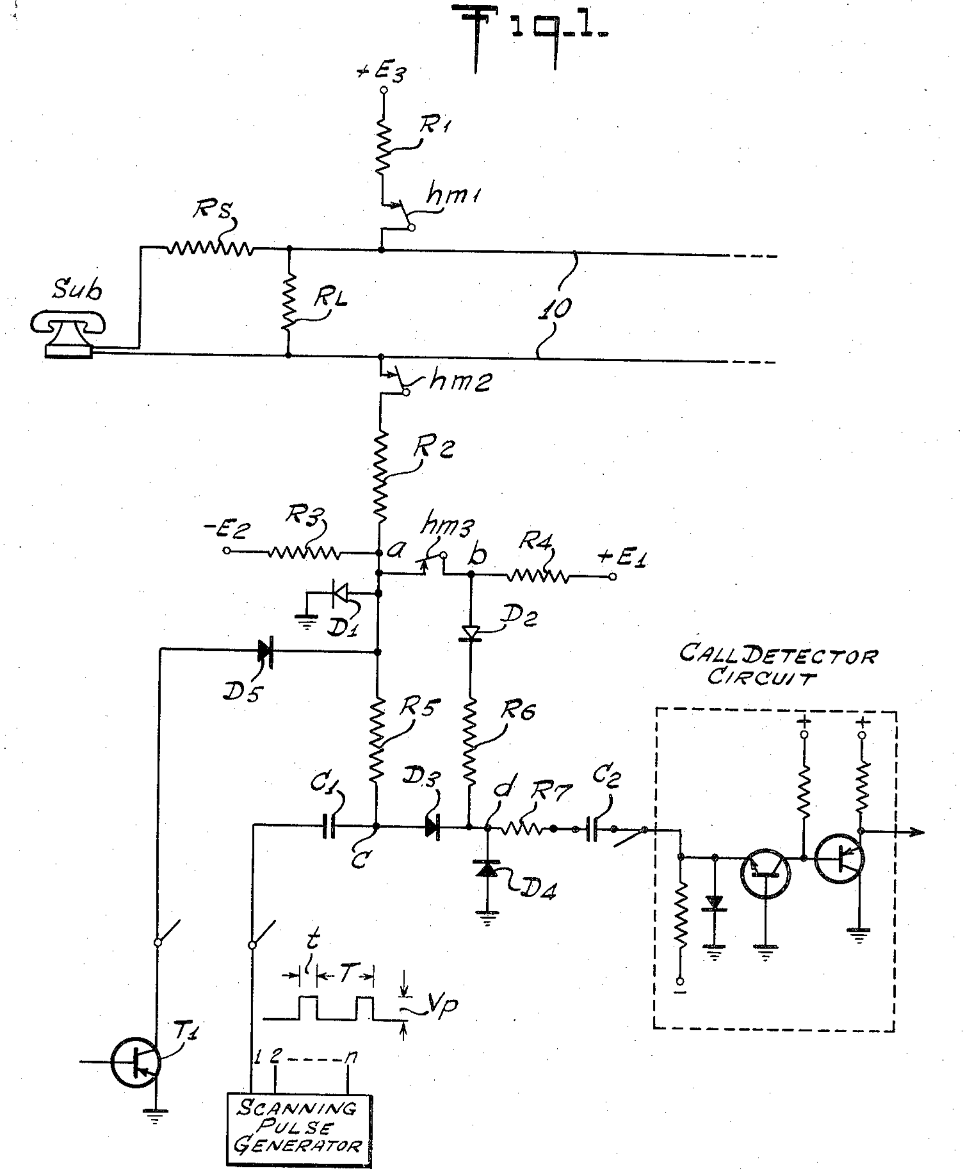
FIG. 1 shows a circuit diagram of the invention in connection with an automatic telephone exchange employing mechanical contacts in the speech paths.

This invention will be explained hereunder with reference to the drawings. In FIG. 1, SUB denotes a subscriber set across a subscriber line 10, $R_S$ is a representative subscriber's line resistance, $R_L$ is the subscriber's line leakage resistance, $R_1$—$R_7$ are resistors, $C_1$ and $C_2$ are capacitors, $D_1$ and $D_2$ are Zener diodes having the Zener voltage $V_1$ and $V_2$, respectively, $D_3$—$D_5$ are other diodes, $T_1$ is a transistor which becomes conductive during the subscriber busy test, $hm_1$–$hm_3$ are break contacts which are associated with either the holding magnet of the crossbar switch or the cutoff relay corresponding to the subscriber, SPG is a scanning pulse generator, DT is a call detector circuit, and $E_1$ to $E_3$ are source voltages of indicated polarity.

In FIG. 1, the scanning pulse train distributed from SPG to each subscriber or subscriber group reaches a scanning gate circuit comprising $C_1$, $R_5$, $D_3$ and $R_6$. If the subscriber's condition is on-hook, the potential $V_{ao}$ at a point *a*, and consequently at points *b* and *c* is, disregarding the effect of the Zener diode $D_1$, as follows:

$$V_{ao}=\frac{R_3(E_3+E_2)}{R_1+R_L+R_2+R_3}-E_2 \qquad (1)$$

If this potential is so chosen as to be more negative than the Zener voltage $-V_1$ of $D_1$, then $$V_{ao}=-V_1 \qquad (2)$$

On the other hand, if the Zener voltage $V_2$ of $D_2$ is so chosen as to satisfy the relation $$V_1>V_2>E_1 \qquad (3)$$

the potential at the point *d* will tend to become $-(V_1-V_2)$, but it will be clamped at a little below the ground potential by $D_4$. Consequently, in this case, a reverse bias voltage $V_1$ is applied across $D_3$. If the peak voltage of the scanning pulse $V_p$ is so chosen that $$V_p<E_1(<V_2<V_1) \qquad (4)$$

this pulse is blocked by $D_3$; thus no gate output will appear at *d*.

Next, if the subscriber lifts up the handset, requesting the service, the potential $V_{a1}$ at the points *a*, *b*, and *c*, again disregarding the effect of $D_1$, is $$V_{a1}=\frac{R_3(E_3+E_2)}{R_1+\frac{R_LR_s}{R_L+R_s}+R_2+R_3}-E_2 \qquad (5)$$

If it is so set as to make this potential more positive than the ground, it is clamped at $$V_{a1}\doteqdot 0 \qquad (6)$$

by the forward characteristics of $D_1$.

In this state, there is no reverse bias across $D_3$, and the scanning pulse is transmitted through $D_3$ to a call detector circuit DT, a simple example of which is diagrammatically included in FIG. 1.

As stated above, when the subscriber raises the handset, the detector circuit DT responds to the scanning pulse, through the subscriber scanning gate under normal condition, and sends out the connection request pulse. Here, the potential at the point *d* will be discussed in a state when the subscriber is originating a call. Every time the scanning pulse reaches the point *d*, electric charge is stored in $C_2$. On the other hand, in the tail edge of the pulse, if the potential at the point *c* becomes lower than that of *d*, $D_3$ acts as a high resistance due to the backward characteristic. Consequently, if the scanning pulse peak value $V_p$ satisfies the Equation 4, and the backward resistances of $D_2$, $D_3$, and $D_4$ are sufficiently high, $C_2$ will be charged up after a certain definite time, and the potential at the point *d* rises to a value near the scanning pulse peak value $V_p$. Under these conditions, let T be the period of the scanning pulse and *t* be the pulse width, then the scanning pulse current reaching the detector circuit DT will be small, that is, only for charging the capacitor again to compensate the discharge (leakage) current through $D_2$, $D_3$, and $D_4$ during the period of $T-t$.

If the threshold current of the detector circuit DT is properly set not to be sensitive against such amount of small pulse current, then, when a subscriber raises the handset, this detector circuit generates connection request pulses for a definite time, and then stops sending the pulse, thus the subscriber lockout is automatically performed. The time required for the detecting circuit DT to detect the connection demand pulse can be changed freely to meet the requirement, and a proper value can be chosen taking into account the subscriber's repeated scanning period.

Next, another case of the subscriber lockout, which is rather more frequent in practice, will be explained. In the previous explanation it was stated that when the subscriber raises the handset, an automatic lockout is performed after sending connection request pulses for a certain definite time. However, in most practical cases, before this automatic lockout occurs, a connection is made to a register by the common control marker. (There is a very rare case in which lockout is performed before this connection is made, that is, a case where many subscribers show simultaneous conditions of originating calls due to subscribers' line group troubles.) Thus, once a subscriber is connected to a register or to a trunk and holds these equipments unnecessarily long, a forced cutoff from the switching network is performed automatically. It is in this case that the subscriber must be completely locked out without any connection request pulse to DT.

Figure 2:
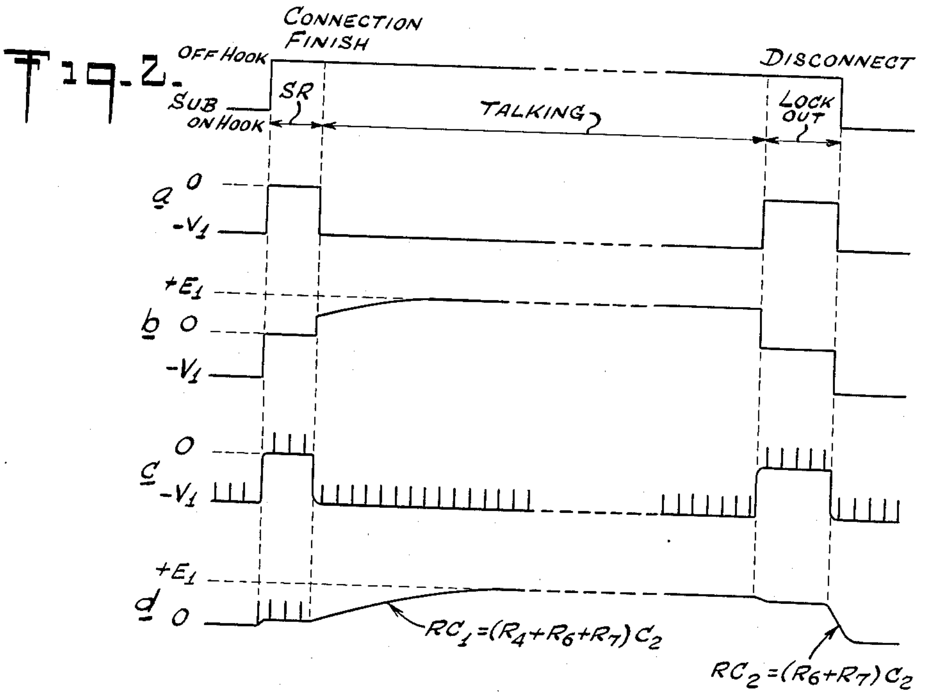
FIG. 2 shows waveforms explanatory of the functioning of the FIG. 1 circuit.

Next, referring to the waveforms of FIG. 2, it will be explained how this is performed by the invented circuit. When a subscriber is connected to a register or to one of the various trunks, $hm_3$ is opened together with the contacts $hm_1$ and $hm_2$, and after the charging current has flowed to $C_2$ through $R_4$, $D_2$, $R_6$, and $R_7$ with the time constant $RC_1=(R_4+R_6+R_7)C_2$, the point *d* will be kept at the potential $E_1$. If, in this state, a forced cutoff is performed by the reason stated before, since the holding magnet corresponding to said subscriber is de-energized, $hm_1$, $hm_2$, and $hm_3$ are closed again.

If, in this case, the subscriber is still keeping the handset off from the telephone set, the point *b* returns to the ground potential, and since the operating point of $D_2$ is not in the Zener region due to the relation $V_2>E_1$, but rather having a high resistance, the potential at *d* is lowered slowly from $E_1$ toward the ground potential by the discharge from $C_2$ consisting of only the leakage current through $D_2$, $D_3$, and $D_4$. When the point *d* goes down to the level of $V_p$, the charging current to $C_2$ by the scanning pulse is again started as stated before, and since the point *d* is always kept thereafter at the level close to $V_p$, no connection request pulse is sent to DT after all.

Next, it will be explained how this lockout state is released comparatively quickly by the subscriber hang-up, referring to the waveforms of FIG. 2. If a subscriber under lockout condition hangs up the handset, the point *b* falls to $-V_1$. Consequently, now $D_2$ becomes conductive by its Zener characteristic, trying to lower the potential at the point *d* to $-(V_1-V_2)$, but if $R_7$ is sufficiently small compared with $R_6$, the potential at the point *d* falls from $V_p$ towards $-(V_1-V_2)$ with the time constant $RC_2=(R_6+R_7)C_2$, and is clamped near the ground potential by $D_4$, returning to the original state. (The time constant $RC_2$ must be chosen so that the lockout state will not be released by a short break pulse such as a dial pulse.)

Finally, some discussions will be made on the functions of the Zener diodes $D_1$ and $D_2$. As stated before, when the crossbar switch operates, $D_2$ forms a path to keep the point *d* at $E_1$, but if the potential difference between the point *d* and the point *b* does not exceed the scanning pulse peak value $V_p$, it acts as a high resistance, completing the subscriber lockout, and after the subscriber hangs up the handset, it utilizes its Zener characteristic to lower the point *d* toward the ground potential in order to release the lockout state quickly, enabling said subscriber to originate a call again.

As shown in the Equations 1 and 5, $D_1$ significantly decreases the potential fluctuations at the point *a* caused by $R_L$ while the subscriber is in the state of on-hook, and significantly decreases fluctuations caused by $R_s$ while the subscriber is in the state of off-hook. Thus, it makes the subscriber lockout reliable and, in addition, it contributes in broadening the allowable scope of the subscriber's line resistance and leakage resistance which always raise problems for the exchanges. Further, $D_1$ decreases the influence of an induced voltage due to the subscriber's line, as well as serving as a lightning arrester for electronic circuit protection with the help of $R_2$.

Figure 3:
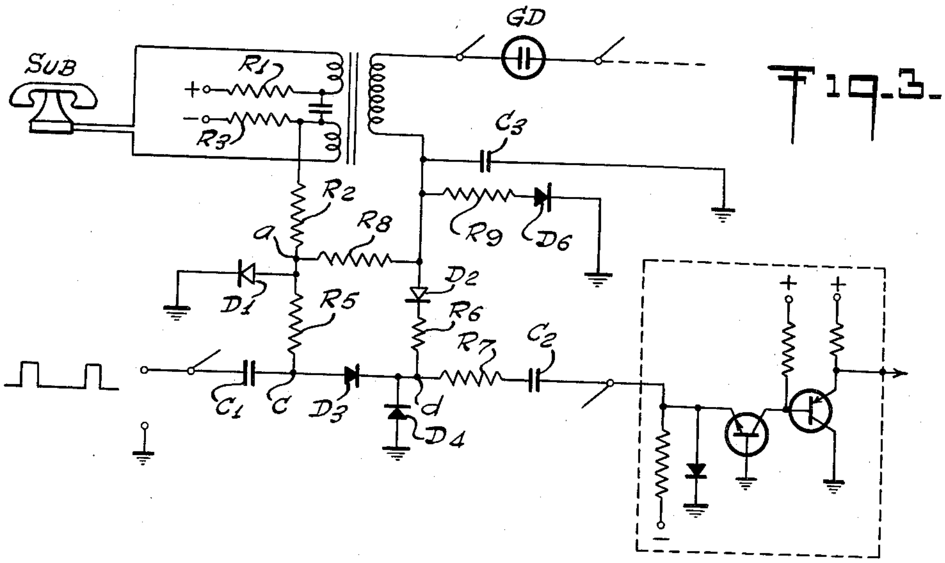
FIG. 3 shows another embodiment of the invention in connection with an all-electronic exchange employing electronic switches for the speech paths.

The above explanation has been made, as an example of this invention, for a case of a semi-electronic exchange where crossbar switches are used as the switching network, but the same principle is applicable to an all-electronic exchange as indicated in FIG. 3.

In FIG. 3, the same notations are applied as those in FIG. 1 to points and elements having the similar functions. Special features for the all-electronic exchange are: GD, a space discharge electronic switch element (for instance, a gas tube); $R_9$, a D.C. circuit element for the electronic switch; $R_8$, a high resistance for coupling; $C_3$, a talking loss compensator by $R_9$; and $D_6$, to prevent the formation of a low resistance by-pass due to $R_9$ when the subscriber hangs up the handset and the potential at the point *b* becomes negative. The performance of this circuit is clear from the explanation of FIG. 1.

While the foregoing description sets forth the principles of the invention in connection with specific apparatus, it is to be understood that this description is made only by way of example and not as a limitation of the scope of the invention as set forth in the objects thereof and in the accompanying claims.

What we claim is:

1. An exchange subscriber circuit comprising the combination with a subscriber line and a call detector circuit, of a source of subscriber scanning pulses, a capacitor through which the pulses activate the call detector circuit upon connection request by the subscriber line, the capacitor charging in response to the pulses during the connection request to lock out the subscriber line from the call detector circuit after a definite interval, and means thereafter effective to discharge the capacitor within a relatively shorter time interval than the charging interval.

2. The invention according to claim 1, the last named means including a Zener diode in circuit connection between the capacitor and the subscriber line.

3. An electronic exchange subscriber circuit comprising a subscriber scanning gate circuit, a diode and capacitor combination with different charging and discharging time constants, in the subscriber scanning gate circuit, and a Zener diode, the scanning pulses in conjunction with the rectifying function of the diode-capacitor combination producing a D.C. potential across the capacitor for controlling subscriber lockout, the forward characteristics of the Zener diode serving to maintain the lockout control potential at a certain definite positive voltage, the cutoff region of the Zener diode being utilized during lockout of the subscriber to insure the lockout control potential being determined solely by the rectification of the scanning pulses, the Zener region of said Zener diode enabling the lockout control potential to fall to reference potential with a certain definite time constant affording release of the lockout state within a suitable time.

References Cited in the file of this patent

UNITED STATES PATENTS

| | | |
|---|---|---|
| 2,504,708 | Long | Apr. 18, 1950 |
| 2,663,763 | Schmitz et al. | Dec. 22, 1953 |
| 2,892,895 | Abbott | June 30, 1959 |